United States Patent
Choe et al.

(10) Patent No.: US 12,301,842 B2
(45) Date of Patent: *May 13, 2025

(54) METHOD, DEVICE AND SYSTEM FOR ENCODING AND DECODING IMAGE

(71) Applicant: IDEAHUB INC., Seoul (KR)

(72) Inventors: Yoon Sik Choe, Goyang-Si (KR); Jang Won Choi, Incheon (KR)

(73) Assignee: IDEAHUB INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,356

(22) Filed: Jun. 19, 2023

(65) Prior Publication Data

US 2023/0353761 A1 Nov. 2, 2023

Related U.S. Application Data

(63) Continuation of application No. 17/576,610, filed on Jan. 14, 2022, now Pat. No. 11,683,506, which is a
(Continued)

(30) Foreign Application Priority Data

Sep. 30, 2013 (KR) ........................ 10-2013-0116220

(51) Int. Cl.
*H04N 19/00* (2014.01)
*H04N 19/117* (2014.01)
(Continued)

(52) U.S. Cl.
CPC ......... *H04N 19/186* (2014.11); *H04N 19/117* (2014.11); *H04N 19/80* (2014.11);
(Continued)

(58) Field of Classification Search
CPC .... H04N 19/186; H04N 19/117; H04N 19/80; H04N 19/11; H04N 19/182; H04N 19/593; H04N 19/70
See application file for complete search history.

(56) References Cited

U.S. PATENT DOCUMENTS

| | | | |
|---|---|---|---|
| 7,227,585 B1 | 6/2007 | Murdock et al. | |
| 9,288,500 B2 | 3/2016 | Budagavi | |

(Continued)

FOREIGN PATENT DOCUMENTS

| | | | |
|---|---|---|---|
| JP | 2009538086 A | 10/2009 | |
| JP | 4989048 B2 | 5/2012 | |

(Continued)

OTHER PUBLICATIONS

B.K. Gunturk et al., Color plane interpolation using alternating projections, IEEE Transactions on Image Processing, pp. 997-1013, (vol. 11, Issue: 9, Sep. 2002).

(Continued)

*Primary Examiner* — Zhihan Zhou
(74) *Attorney, Agent, or Firm* — WILLIAM PARK & ASSOCIATES LTD.

(57) ABSTRACT

Disclosed are methods, apparatuses, and systems for encoding and decoding an image. The present invention provides an intra prediction unit receives an input image, removes high frequency ingredients by low pass filtering an encoded luma pixel value in the input image during intra prediction, and generates a prediction block by predicting a chroma pixel value by using a low pass filter (LPF) LM chroma mode for applying an LM chroma mode, which is an extended chroma mode technique for generating a prediction block by predicting the chroma pixel value by applying a correlation between color planes to the luma pixel value having removed therefrom the high frequency ingredients.

6 Claims, 7 Drawing Sheets

Related U.S. Application Data continuation of application No. 17/138,076, filed on Dec. 30, 2020, now Pat. No. 11,252,421, which is a continuation of application No. 15/026,154, filed as application No. PCT/KR2014/009221 on Sep. 30, 2014, now Pat. No. 10,904,539.

(51) Int. Cl.

| | | |
|---|---|---|
| *H04N 19/186* | (2014.01) | |
| *H04N 19/80* | (2014.01) | |
| H04N 19/11 | (2014.01) | |
| H04N 19/182 | (2014.01) | |
| H04N 19/593 | (2014.01) | |
| H04N 19/70 | (2014.01) | |

(52) U.S. Cl.
CPC ............ *H04N 19/11* (2014.11); *H04N 19/182* (2014.11); *H04N 19/593* (2014.11); *H04N 19/70* (2014.11)

(56) References Cited

U.S. PATENT DOCUMENTS

| | | | |
|---|---|---|---|
| 9,307,237 B2* | 4/2016 | Liu | H04N 19/503 |
| 9,351,001 B2 | 5/2016 | Yang et al. | |
| 9,948,938 B2 | 4/2018 | Gupte et al. | |
| 10,158,882 B2 | 12/2018 | Choe et al. | |
| 2006/0245660 A1 | 11/2006 | Hung | |
| 2007/0115384 A1* | 5/2007 | Furukawa | G06T 5/80 |
| | | | 348/335 |
| 2008/0284792 A1 | 11/2008 | Bell et al. | |
| 2009/0297054 A1 | 12/2009 | Regunathan et al. | |
| 2010/0208993 A1 | 8/2010 | Sambongi | |
| 2012/0328013 A1 | 12/2012 | Budagavi et al. | |
| 2013/0114706 A1* | 5/2013 | Gisquet | H04N 19/593 |
| | | | 375/240.12 |
| 2013/0182761 A1 | 7/2013 | Chen et al. | |
| 2013/0188703 A1* | 7/2013 | Liu | H04N 19/50 |
| | | | 375/240.12 |
| 2013/0188883 A1* | 7/2013 | Gisquet | H04N 19/136 |
| | | | 382/233 |
| 2013/0336591 A1* | 12/2013 | Jeon | H04N 19/132 |
| | | | 382/238 |
| 2014/0078394 A1 | 3/2014 | Lou et al. | |
| 2014/0140401 A1 | 5/2014 | Lee et al. | |
| 2014/0314142 A1 | 10/2014 | Oh et al. | |
| 2015/0003524 A1 | 1/2015 | Yamamoto et al. | |
| 2015/0063460 A1 | 3/2015 | Gamei et al. | |
| 2015/0078447 A1 | 3/2015 | Gamei et al. | |
| 2015/0341636 A1 | 11/2015 | Tsai et al. | |
| 2016/0241861 A1 | 8/2016 | Choe et al. | |

FOREIGN PATENT DOCUMENTS

| | | |
|---|---|---|
| KR | 1019980074945 A | 11/1998 |
| KR | 1020070072327 A | 7/2007 |
| KR | 1020120003147 A | 1/2012 |
| KR | 1020120041287 A | 5/2012 |
| KR | 1020130004214 A | 1/2013 |
| KR | 1020130044263 A | 5/2013 |
| KR | 1020130078320 A | 7/2013 |

OTHER PUBLICATIONS

Jianle Chen, et al., CE6.a.4: Chroma intra prediction by reconstructed luma samples, Document: JCTVC-E266, Joint Collaborative Team on Video Coding (JCT-VC) of ITU-T SG16 WP3 and ISO/IEC JTC1/SC29/WG11, 5th Meeting: Geneva, Mar. 16-23, 2011.

Jungsun Kim, RCE1: The performance of extended chroma for non 4:2:0 format, Document: JCTVC-M0097, Joint Collaborative Team on Video Coding (JCT-VC) of ITU-T SG16 WP3 and ISO/IEC JTC I/SC 29/WG 11, 13th Meeting: Incheon, KR, Apr. 18-26, 2013.

* cited by examiner

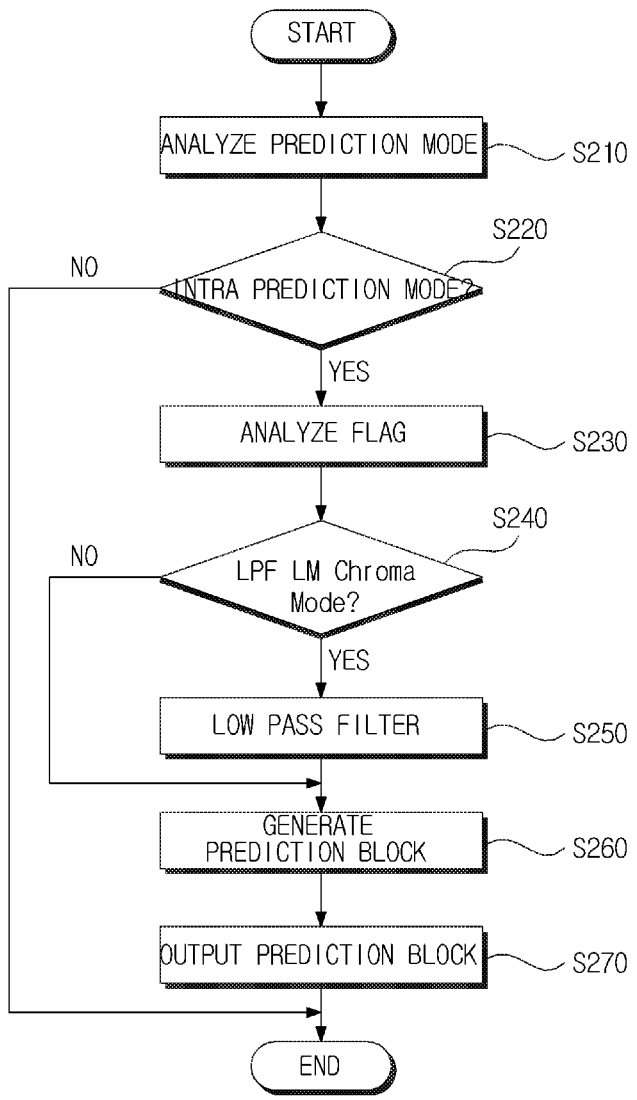

METHOD, DEVICE AND SYSTEM FOR ENCODING AND DECODING IMAGE

CROSS-REFERENCE TO RELATED APPLICATIONS

This application is a continuation of U.S. application Ser. No. 17/576,610, filed on Jan. 14, 2022, which is a continuation of U.S. application Ser. No. 17/138,076, filed Dec. 30, 2020, which is a continuation of U.S. application Ser. No. 15/026,154, filed Mar. 30, 2016, which was the Nation Stage of International Application No. PCT/KR2014/009221, filed Sep. 30, 2014, which claims priority to Korean Application No. 10-2013-0116220, filed Sep. 30, 2013, the disclosures of each of which are incorporated herein by reference in their entirety.

TECHNICAL FIELD

The present disclosure relates to a method of encoding and decoding an image, apparatus and system therefor, and more particularly, to a method of encoding and decoding an image, apparatus and system therefor for improving efficiencies of predictions between color planes of a RGB image in high efficiency video coding (HEVC).

BACKGROUND ART

Following the standardized high efficiency video coding (HEVC), a HEVC range extension is currently being standardized for developing an extended technique for supporting 4:2:2 and 4:4:4 color samplings and YUV images and RGB images corresponding to 10 bit, 12 bit, and 14 bit depths. Here, unlike a YUV image, a RGB image exhibits high correlations between respective color planes R, G, and B. Based on the same, an extended chroma mode (referred to hereinafter as 'ECM') has been suggested by J. Kim at a recent MPEG standardization conference (J. Kim, "RCE1: The performance of extended chroma mode for non 4:2:0 format, JCTVC-M0097, 13th JCT-VC Meeting, Incheon, Korea, April 2013)

The ECM suggested by J. Kim is a technique for predicting pixel values for chroma (or B, R) with reference to an encoded luma (or G) pixel in case of an intra prediction for chroma (U, V; BR in the RGB coding) pixel. The algorithm employs a technique suggested by J. Chen during the standardization of the HEVC, but is not employed by the HEVC (J. Chen, V. Seregin, W-J Han, J. Kim, B. Jeon, "CE6.a.4: chroma intra prediction by reconstructed luma samples", JCTVC-E266, 5thMeeting, Geneva, Switzerland, March 2011). However, unlike the YUV 4:2:0 format of the HEVC, the RGB 4:4:4 format exhibits high correlations between color planes. Therefore, if the technique suggested by J. Chen is modified in correspondence to the RGB 4:4:4 format instead of the YUV format and applied to the RGB 4:4:4 format, compression efficiency may be significantly improved. In other words, a high coding gain may be obtained. Therefore, the technique may be applied to the HEVC range extension.

However, as a result of analysis of a large number of RGB images, a common RGB image exhibits low correlations between color planes at high frequency areas of the color planes. In other words, due to low correlations between color planes at high frequency areas, high frequency ingredients for luma area may interfere chroma pixel prediction during an application of the ECM, thereby deteriorating compression efficiency.

TABLE 1

| Test sequence | G/B | | | | G/R | | | |
|---|---|---|---|---|---|---|---|---|
| | LL | LH | HL | HH | LL | LH | HL | HH |
| Traffic | 0.926 | 0.634 | 0.614 | 0.549 | 0.963 | 0.837 | 0.810 | 0.777 |
| Kimono1 | 0.948 | −0.105 | 0.136 | −0.008 | 0.977 | −0.011 | 0.303 | 0.045 |
| EBULupoCandlelight | 0.820 | 0.859 | 0.869 | 0.899 | 0.904 | 0.944 | 0.929 | 0.940 |
| EBURainFruits | 0.909 | 0.972 | 0.970 | 0.955 | 0.892 | 0.971 | 0.969 | 0.956 |
| VenueVu | 0.720 | 0.885 | 0.853 | 0.553 | 0.597 | 0.840 | 0.604 | 0.229 |
| DucksAndLegs | 0.906 | 0.227 | −0.090 | −0.154 | 0.963 | 0.238 | 0.125 | −0.186 |
| OldTownCross | 0.981 | 0.456 | 0.265 | 0.025 | 0.984 | 0.617 | 0.466 | 0.243 |
| ParkScene | 0.919 | 0.247 | 0.443 | 0.117 | 0.972 | 0.406 | 0.462 | 0.126 |
| Overall | 0.891 | 0.522 | 0.508 | 0.367 | 0.907 | 0.605 | 0.584 | 0.391 |

Table 1 shows results of calculating correlations between four frequency bands between color planes (G-B and G-R) by using first frames of 8 RGB experimental images currently used in the HEVC range extension and shows correlations between color planes corresponding to respective frequency bands in HEVC range extension RGB experimental images. Table 1 is published in "Color plane interpolation using alternating projections," (B. K. Gunturk, Y. Altunbasak, and R. M. Mersereau), IEEE Trans. Video Processing, Vol. 11, No. 9, pp. 997-1013, September 2002. The technique disclosed therein can analyze frequencies of an RGB image based on mathematical analysis of correlations between color planes R, G, and B, where each correlation has a range from −1 to 1. The higher the correlation indicates the corresponding color planes having the higher correlation to each other.

In Table 1, the LL frequency band indicates low frequency ingredients of an image, the LH and HL frequency bands indicate horizontal and vertical edge ingredients of the image, and the HH frequency band indicates diagonal edge ingredients of the image, that is, high frequency ingredients. Except an EBULupoCandlelight image and an EBURainFruits image, images generally exhibit high correlations in low frequency areas LL and low correlations in high frequency areas HH. Referring to Table 1, RGB images exhibit high correlations (0.90 average) in LL frequency bands and low correlations (0.38 average) in HH frequency bands. As shown in Table 1, high frequency ingredients having low correlations compared to the other frequency ingredients having generally high correlations may deteriorate compression efficiency when pixel values between color planes are predicted by using the ECM.

DETAILED DESCRIPTION OF THE INVENTION

Technical Problem

The present invention provides methods of encoding and decoding an image for improving efficiency of predicting pixel values between color planes by filtering high frequency ingredients exhibiting low correlations between the color planes.

The present invention also provides apparatuses for encoding and decoding an image for accomplishing the technical goal.

The present invention also provides a system for encoding and decoding an image for accomplishing the technical goal.

Technical Solution

According to an aspect of the present invention, there is provided an image encoding apparatus including an intra prediction unit that receives an input image, removes high frequency ingredients by low pass filtering pixel values of an encoded luma area in the input image during intra prediction, and generates a prediction block by predicting pixel values of chroma areas by using a low pass filter (LPF) LM chroma mode for applying an LM chroma mode, which is an extended chroma mode technique for generating a prediction block by predicting the chroma pixel value by applying a correlation between color planes to a luma pixel value having removed therefrom the high frequency ingredients.

The intra prediction unit includes a chroma predicting unit, which performs intra prediction with respect to the luma pixel value of the input image in a plurality of pre-set modes including the LM chroma mode and the LPF LM chroma mode and generates a plurality of prediction blocks; a rate-distortion optimizing unit, which receives the plurality of prediction blocks and determines an optimal prediction block from among the plurality of prediction blocks according to pre-set rules; and a mode selecting unit, which sets up a flag corresponding to a mode for generating the optimal prediction block from among the plurality of modes and outputs the flag together with the optimal prediction block.

The image encoding apparatus generates a bitstream of an RGB image corresponding to a high correlation between color planes by using the prediction blocks and outputs the bitstream.

According to another aspect of the present invention, there is provided an image decoding apparatus including an intra prediction unit that receives a bitstream, removes high frequency ingredients by low pass filtering pixel values of a decoding-completed luma area in the bitstream during intra prediction, and generates a prediction block by predicting pixel values of chroma areas by using a low pass filter (LPF) LM chroma mode for applying an LM chroma mode, which is an extended chroma mode technique for generating a prediction block by predicting the chroma pixel value by applying a correlation between color planes to a luma pixel value having removed therefrom the high frequency ingredients The intra prediction unit includes a flag analyzing unit, which analyzes a flag set to the bitstream; a mode selecting unit, which selects a mode for performing intra prediction from among a plurality of pre-set modes including the LM chroma mode and the LPF LM chroma mode based on the analyzed flag; and a chroma predicting unit, which generates a prediction block by performing intra prediction in the mode selected from among the plurality of modes.

The chroma predicting unit generates the prediction block according to an equation $C_{pred}[x,y] = \alpha G_{recon}^{lpf}[x,y] + \beta$ (here, $G_{recon}^{lpf}$ denotes a pixel value of a low pass filtered G block, and, like in Equation 1, $\alpha$ and $\beta$ are weights and are inferred by using pixel values of the G block at same locations as pixel values around the B block or the R block), and pixel values of a block of the low pass filtered luma area are calculated according to an equation $G_{recon}^{lpf}[x,y] = 0.5 G_{recon}[x,y] + 0.125 G_{recon}[x+1,y] + 0.125 G_{recon}[x-1,y] + 0.125\ G_{recon}[x,y+1] + 0.125 G_{recon}[x,y-1]$.

According to another aspect of the present invention, there is provided an image encoding method employed by an image encoding apparatus that receives an input image, encodes the input image based on intra prediction, and outputs a bitstream, the method including removing, by the image encoding apparatus, high frequency ingredients by low pass filtering pixel values of an encoding-completed luma area in the input image during intra prediction; generating, by the image encoding apparatus, a prediction block by predicting chroma pixel values by using a low pass filter (LPF) LM chroma mode for applying an LM chroma mode, which is an extended chroma mode technique for generating a prediction block by predicting the chroma pixel value by applying a correlation between color planes to a luma pixel value having removed therefrom the high frequency ingredients; and, generating a bitstream of a RGB image by using the prediction block and outputting the bitstream.

The generating of the prediction block includes performing intra prediction with respect to the luma pixel value of the input image in a plurality of pre-set modes including the LM chroma mode and the LPF LM chroma mode and generating a plurality of prediction blocks; determining an optimal prediction block from among the plurality of prediction blocks according to pre-set rules; and setting up a flag corresponding to a mode for generating the optimal prediction block from among the plurality of modes and outputting the flag together with the optimal prediction block.

According to another aspect of the present invention, there is provided an image decoding method employed by an image encoding apparatus that receives a bitstream, encodes the bitstream based on intra prediction, and outputs a reconstructed image, the method including receiving, by the image decoding apparatus, the bitstream; removing, by the image decoding apparatus, high frequency ingredients by low pass filtering pixel values of an decoding-completed luma area in the bitstream during intra prediction and generating, by the image decoding apparatus, a prediction block by predicting chroma pixel values by using a low pass filter (LPF) LM chroma mode for applying an LM chroma mode, which is an extended chroma mode technique for generating a prediction block by predicting the chroma pixel value by applying a correlation between color planes to a luma pixel value having removed therefrom the high frequency ingredients; and outputting the reconstructed image by using the prediction block.

The generating of the prediction block includes analyzing a flag set to the bitstream; selecting a mode for performing intra prediction from among a plurality of pre-set modes including the LM chroma mode and the LPF LM chroma mode based on the analyzed flag; and, if the selected mode is the LPF LM chroma mode, generating a prediction block by predicting a chroma pixel value by using the LPF LM chroma mode technique.

According to another aspect of the present invention, there is provided an imaging system including an image encoding apparatus that receives an input image, removes high frequency ingredients by low pass filtering pixel values of an encoding-completed luma area in the input image during intra prediction, and generates a prediction block by predicting pixel values of chroma areas by using a low pass filter (LPF) LM chroma mode for applying an LM chroma mode, which is an extended chroma mode technique for generating a prediction block by predicting the chroma pixel value by applying a correlation between color planes to a luma pixel value having removed therefrom the high frequency ingredients; and an image decoding apparatus that receives the bitstream, generates a prediction block by predicting pixel values of chroma areas by applying the LPF LM chroma mode to pixel values of the decoding-completed luma area having removed therefrom the high frequency ingredients, and outputs a reconstructed image by using the prediction block.

The image encoding apparatus includes an intra prediction unit that includes a chroma predicting unit, which performs intra prediction with respect to the luma pixel value of the input image in a plurality of pre-set modes including the LM chroma mode and the LPF LM chroma mode and generates a plurality of prediction blocks; a rate-distortion optimizing unit, which receives the plurality of prediction blocks and determines an optimal prediction block from among the plurality of prediction blocks according to pre-set rules; and a mode selecting unit, which sets up a flag corresponding to a mode for generating the optimal prediction block from among the plurality of modes and outputs the flag together with the optimal prediction block.

Advantageous Effects

Therefore, methods, apparatuses, and a system for encoding and decoding an image according to the present invention additionally provide a low pass filter (LPF) LM chroma mode for applying low pass filtering with respect to a high frequency area corresponding to a low correlation between color planes in an extended chroma mode and select an optimal mode from among conventional intra prediction modes and the LPF LM chroma mode for encoding and decoding an image at an improved coding efficiency.

DESCRIPTION OF THE DRAWINGS

FIG. 7 is a diagram showing an example of intra prediction methods for a decoding operation performed by the intra predicting unit of FIG. 6.

MODE OF THE INVENTION

Figure 1A:
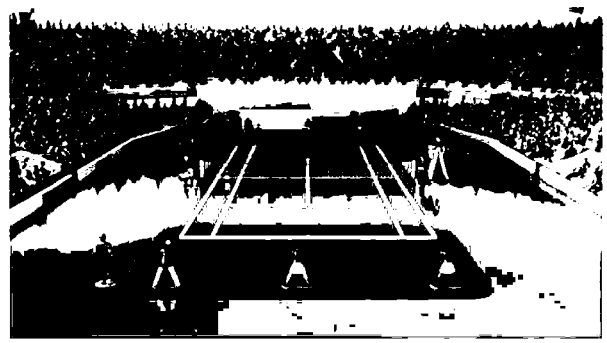
FIGS. 1A to 1C are diagrams showing in-screen correlations between high frequency areas of color planes in an image.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Throughout the specification, when a portion "includes" an element, another element may be further included, rather than excluding the existence of the other element, unless otherwise described. As used herein, the terms "unit", "element", "module", etc. should be understood as units in which at least one function or operation is performed and which may be embodied in the form of hardware, software, or a combination of hardware and software.

As described above, an extended chroma mode (ECM) is a technique for predicting pixel values in a chroma area with reference to an encoded luma area during an intra prediction for chroma pixel. By using the technique, a very high coding gain may be obtained with respect to an RGB image exhibiting high correlations between color planes. The ECM is included to an intra prediction mode for chroma pixel and is configured to be selected via a competition with conventional intra prediction modes for chroma pixel.

Since an RGB image is encoded in the order of G, B, and R, a color plane B and a color plane R may be encoded in the intra prediction mode for chroma pixel. Equation 1 below is a mathematical expression of the ECM technique regarding an RGB image.

$$C_{pred}[x, y] = \alpha G_{recon}[x, y] + \beta \qquad \text{[Equation 1]}$$

Here, $C_{pred}$ denotes a pixel value of a B block or a R block to be predicted, $G_{recon}$ denotes a decoded pixel value of an encoded G block, and [x, y] denote locations of pixels. α and β are weights and are inferred by using pixel values of the G block at same locations as pixel values around the B block or the R block.

As shown in Equation 1, the ECM is a technique for predicting chroma pixel values by using pixel values of an encoded luma pixel. However, the ECM technique may be useful only when correlations between color planes are high.

Figure 1B:
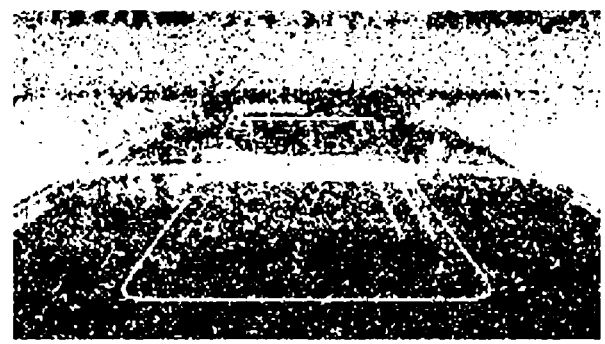
Figure 1C:

FIGS. 1A-1C are diagrams showing intra correlations between high frequency areas of color planes in an image.

FIGS. 1A-1C show intra correlations between the high frequency areas HH of color planes G-B and color planes G-R in the first frame of a VenueVu image from among the eight images shown in Table 1. FIG. 1A shows an original image, FIG. 1B shows intra correlations between the high frequency areas of the color planes G-B, and FIG. 1C shows intra correlation between the high frequency areas of the color planes G-R. In FIGS. 1B and 1C, the correlations between the color planes G-B and the correlations between the color planes G-R are calculated by splitting screen images to 8×8 blocks. Darker areas indicate lower correlations, whereas brighter areas indicate higher correlations.

Referring to FIGS. 1B and 1C, an image includes both areas corresponding to high correlations between high frequency areas of color planes and areas corresponding to low correlations between the high frequency areas of the color planes.

Therefore, according to the present invention, when pixel values are predicted by using the ECM to improve accuracy of a prediction between color planes, efficiency of the prediction between the color planes may be improved by removing high frequency ingredients of a luma (G) area having a low correlation in advance. Furthermore, to handle changes of correlations of an in-screen high frequency area, the present invention suggests a prediction unit (PU) adaptive filtering technique.

Figure 2:
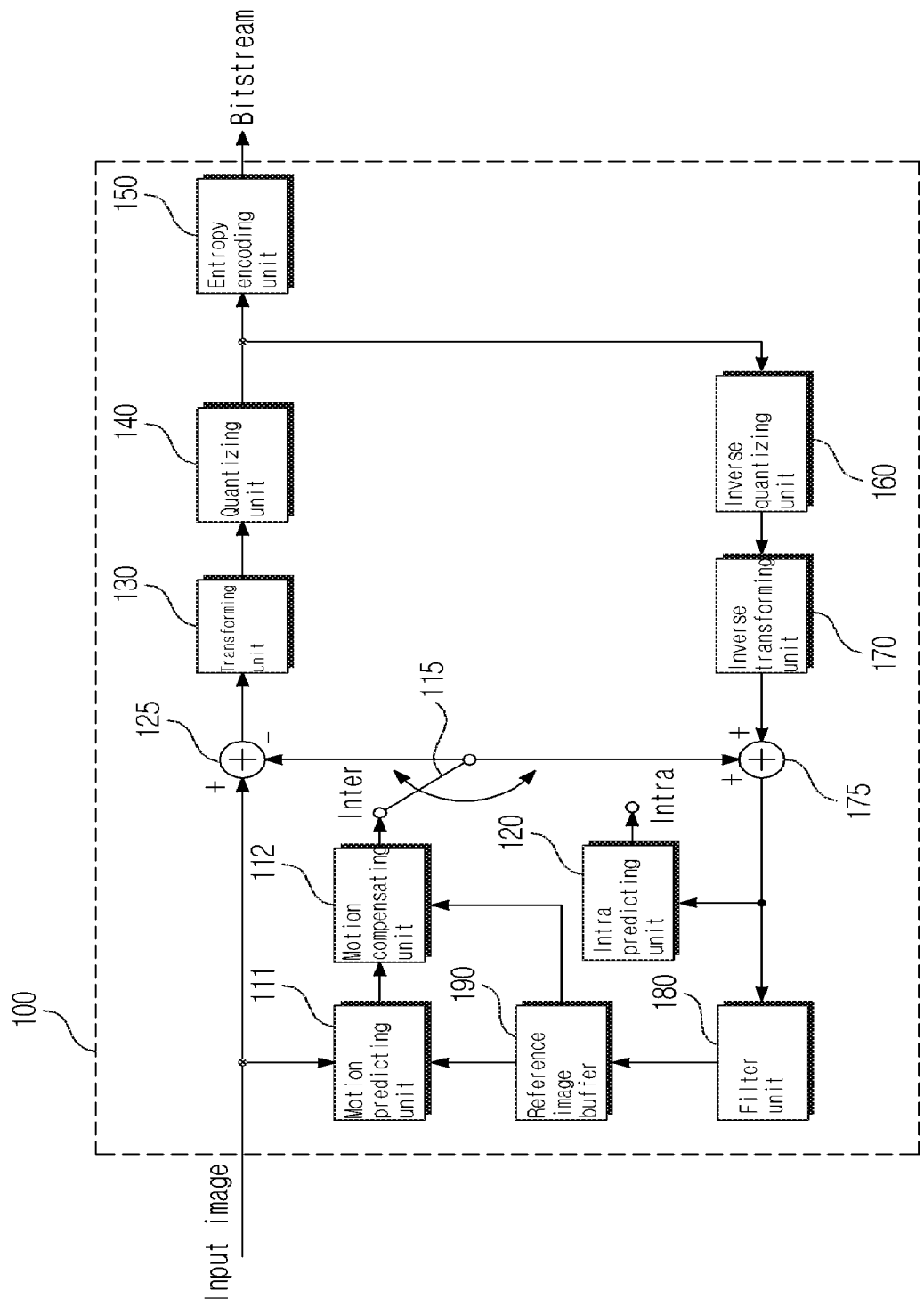
FIG. 2 is a schematic block diagram showing an image encoding apparatus according to the present invention.

FIG. 2 is a schematic block diagram showing an image encoding apparatus 100 according to the present invention.

Referring to FIG. 2, the image encoding apparatus 100 includes a motion predicting unit 111, a motion compensating unit 112, an intra predicting unit 120, a switch 115, a subtractor 125, a transforming unit 130, a quantizing unit 140, an entropy encoding unit 150, an inverse quantizing unit 160, an inverse transforming unit 170, an adder 175, a filter unit 180, and a reference image buffer 190.

The image encoding apparatus 100 encodes an input image in an intra mode or an inter mode and outputs a bitstream. In the below embodiments of the present invention, an intra prediction may be used as a synonym of an intra prediction, whereas an inter prediction may be used as a synonym of an inter prediction. To determine the optimal prediction method regarding a prediction unit, an intra prediction mode and an inter prediction mode may be selectively applied with respect to the prediction unit. The image encoding apparatus 100 may generate a prediction block regarding an original block of an input image and encodes a difference between the original block and the prediction block.

In an intra prediction mode, the intra predicting unit 120 (an intra prediction unit may be used as a synonym) supports a chroma mode for predicting chroma pixel values (B, R) with reference to pixel values of an encoded luma (G) pixel during intra predictions of chroma (B, R) screen images. In particular, the intra predicting unit 120 according to the present invention provides not only chroma modes provided by a conventional intra prediction unit, which include a planar mode, a vertical mode, a horizontal mode, and a DC mode, but also an LM chroma mode, which is an ECM suggested by J. Kim, and a low pass filter (LPF) LM chroma mode, which is a mode for applying an ECM after removing high frequency ingredients of a Luma (G) area by using a LPF according to the present invention. The intra predicting unit 120 generates prediction blocks in all available modes, selects the most efficient mode, and outputs a prediction block generated in the selected mode. Detailed descriptions of the intra predicting unit 120 will be given below.

In an inter prediction mode, the motion predicting unit 111 searches for an area of a reference image stored in the reference image buffer 190, which is the best-matched to an input block, and calculates a motion vector during a motion prediction. The motion compensating unit 112 generates a prediction block by performing motion compensation by using the motion vector.

The subtractor 125 generates a residual block based on a difference between the input block and the generated prediction block. The transforming unit 130 performs transformation with respect to the residual block and outputs a transformation coefficient. Furthermore, the quantizing unit 140 quantizes the input transformation coefficient according to quantization parameters and outputs a quantized coefficient. The entropy encoding unit 150 entropy-encodes the input quantized coefficient based on probability distribution and outputs a bitstream.

Since inter prediction encoding, that is, inter prediction encoding is performed in the HEVC, it is necessary to decode and store a currently encoded image to be used as a reference image. Therefore, a quantized coefficient is inverse quantized by the inverse quantizing unit 160 and is inverse transformed by the inverse transforming unit 170. The inverse-quantized and inverse-transformed coefficient is added to a prediction block by the adder 175, and thus a reconstructed block is generated.

The reconstructed block is filtered by the filter unit 180, where the filter unit 180 may apply at least one of a deblocking filter, a sample adaptive offset (SAO), and an adaptive loop filter (ALF) to the reconstructed block or a reconstructed picture. The filter unit 180 may also be referred to as an adaptive in-loop filter. The deblocking filter may remove block distortions formed at boundaries between blocks. The SAO may add a suitable offset value to a pixel value for compensating a coding error. The ALF may be performed based on values obtained by comparing a reconstructed image to an original image and may be performed only when high efficiency is required. The reconstructed block filtered by the filter unit 180 is stored in the reference image buffer 190.

Figure 3:
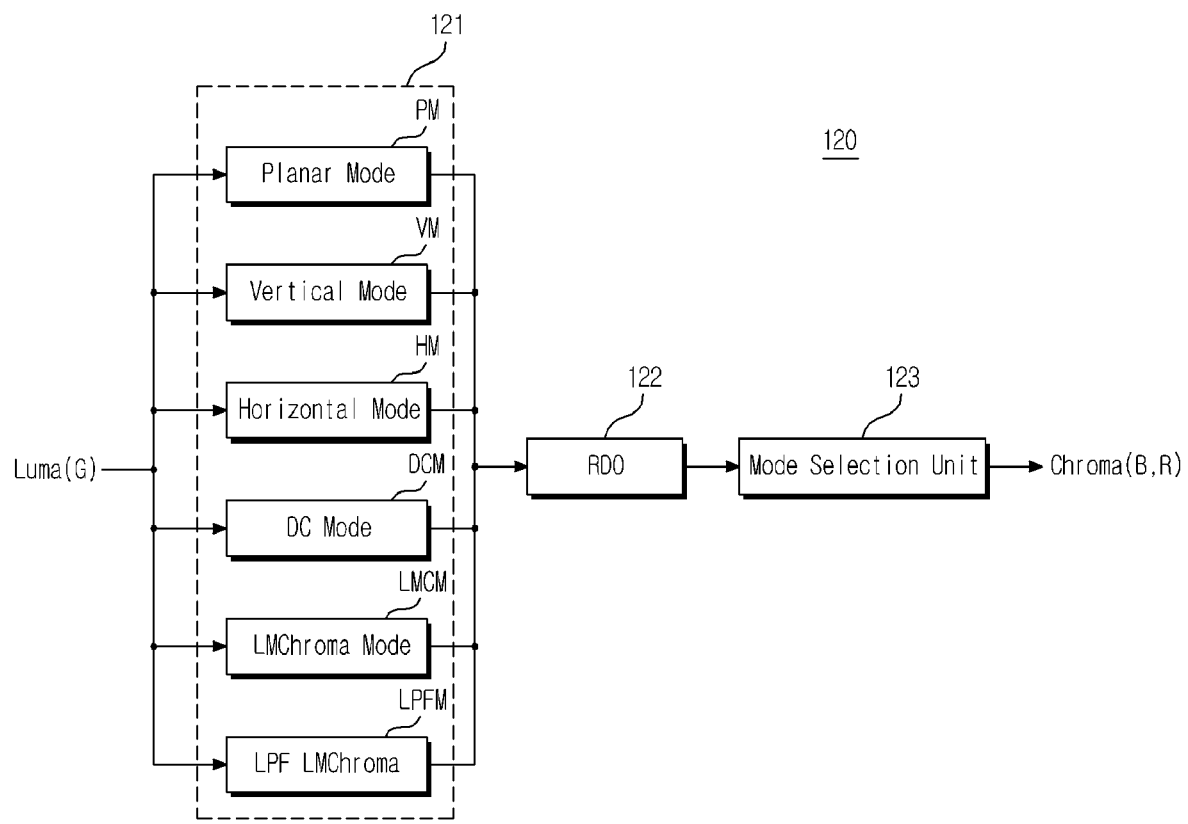
FIG. 3 is a diagram showing an example of the intra prediction unit of FIG. 2.

FIG. 3 is a diagram showing an example of the intra prediction unit of FIG. 2.

In the HEVC, in addition to encoding of macro block in the related art, three new units, which are a coding unit (CU), a prediction unit (PU), and a transformation unit (TU), are additionally defined. From among the new units, when a block-by-block splitting operation is performed and coding units are determined, the prediction unit is determined with respect to all coding units that are no longer split. According to the present invention, when the intra predicting unit 120 predicts a chroma pixel value (B, R) via prediction between color planes during prediction of pixel values by using prediction units, high frequency ingredients of a luma (G) that is arranged at a same location as chromas (B, R) to be encoded are removed by using a low pass filter (LPF). Therefore, the present invention may provide a filtering technique adaptive to changes of correlations of a luma (G) area from which high frequency ingredients are removed.

Although the intra predicting unit 120 of FIG. 3 may support modes other than the chroma mode, only the configuration regarding the chroma mode for predicting pixel values of chroma (B, R) areas with reference to pixel values of encoding-completed luma (G) area is shown for convenience of explanation.

In FIG. 3, the intra predicting unit 120 includes a chroma predicting unit 121, a rate-distortion optimizing unit 122, and a mode selecting unit 123.

Like a conventional intra prediction unit, the chroma predicting unit 121 includes a planar mode prediction unit PM, a vertical mode prediction unit VM, a horizontal mode prediction unit HM, and a DC mode prediction unit DC mode. The planar mode prediction unit PM, the vertical mode prediction unit VM, the horizontal mode prediction unit HM, and the DC mode prediction unit DC mode perform intra predictions by using intra prediction modes known in the art, that is, a planar mode, a vertical mode, a horizontal mode, and a DC mode. Since those predictions are known in the art, detailed descriptions thereof will be omitted.

Furthermore, the chroma predicting unit 121 according to the present invention includes a LM chroma mode prediction unit LMCM for ECM and a LPF LM chroma mode LPFM that applies ECM after high frequency ingredients of the luma (G) area are removed by using a low pass filter (LPF).

The LM chroma mode prediction unit LMCM receives a block of the encoded luma (G) area and predicts pixel values of the chroma (B, R) areas by applying a pixel value of the received block of the luma (G) area to Equation 1.

Meanwhile, although being similar to the LM chroma mode, the LPF LM chroma mode LPFM removes high frequency ingredients from a block of the luma (G) area by applying a low pass filter (LPF) before performing the LM chroma mode, and then the LPF LM chroma mode LPFM predicts pixel values by performing the LM chroma mode.

Equation 2 is a mathematical expression of a block prediction technique performed by the LPF LM chroma mode LPFM.

$$C_{pred}[x, y] = \alpha G_{recon}^{lpf}[x, y] + \beta \quad \text{[Equation 2]}$$

(here, $G_{recon}^{lpf}$ denotes a pixel value of a low pass filtered G block, and, like in Equation 1, $\alpha$ and $\beta$ are weights and are inferred by using pixel values of the G block at same locations as pixel values around the B block or the R block.)

$$G_{recon}^{lpf}[x,y] = 0.5 G_{recon}[x,y] + 0.125 G_{recon}[x+1,y] + 0.125 G_{recon}[x-1,y] + 0.125 G_{recon}[x,y+1] + 0.125 G_{recon}[x,y-1] \quad \text{[Equation 3]}$$

Equation 3 is an example of calculating a pixel value recon of a low pass filtered G block by using four surrounding pixel values. When the chroma predicting unit 121 performs chroma predictions in all modes set up by using the planar mode prediction unit PM, the vertical mode prediction unit VM, the horizontal mode prediction unit HM, the DC mode prediction unit DC mode, the LM chroma mode prediction unit LMCM, and the LPF LM chroma mode LPFM, the rate-distortion optimizing unit 122 receives pixel values of prediction blocks chroma-predicted in a plurality of modes and determines an optimal mode.

The mode selecting unit 123 receives information regarding the optimal mode determined by the rate-distortion optimizing unit 122, sets up a flag corresponding to the optimal mode, and transmits the set up flag together with predicted pixel values regarding a corresponding block.

In other words, the intra predicting unit 120 provides not only conventional intra prediction modes, which are a planar mode, a vertical mode, a horizontal mode, and a DC mode, but also an LM chroma mode, which is an ECM suggested by J. Kim, and a low pass filter (LPF) LM chroma mode, which is a mode for applying an ECM after removing high frequency ingredients of a Luma (G) area by using a LPF according to the present invention. Furthermore, after block prediction is individually performed in each of the modes, an optimal mode is selected, and information regarding the selected optimal mode is transmitted together with pixel values regarding a block that are predicted in the optimal mode. Therefore, efficiency of predicting pixel values between color planes may be significantly improved.

Table 2 shows an example of techniques for defining flags according to an inter prediction mode for chroma pixel according to the present invention.

TABLE 2

| intra_chroma_pred_mode | chroma_pred_from_luma_enabled_flag = 1 | | chroma_pred_from_luma_enabled_flag = 0 | |
| --- | --- | --- | --- | --- |
| | prefix | suffix | prefix | suffix |
| 6 (DM_CHROMA) | 0 | n/a | n/a | n/a |
| 5 (proposed method) | 10 | 1 | 0 | n/a |
| 4 (ECM) | 10 | 0 | 0 | n/a |
| 0 (PLANAR) | 11 | 00 | 1 | 00 |
| 1 (VERTICAL) | 11 | 01 | 1 | 01 |
| 2 (HORIZONTAL) | 11 | 10 | 1 | 10 |
| 3 (DC) | 11 | 11 | 1 | 11 |

As shown in Table 2, as an intra prediction mode for pixel is increased to an LM chroma mode and an LPF LM chroma mode, a flag may be set up by adding a suffix 0 (when filtering is not applied) or a suffix 1 (when filtering is applied) based on whether a low pass filtering is performed in the LM chroma mode (prefix: 10) during binarization of intra prediction as shown in the second and third columns of Table 2. In other words, although only the prefix '10' bit was used as a flag for encoding a mode in an ECM mode in the related art, both the prefix '10' bit and the suffix 1 bit are used to additionally use the LPF LM chroma mode according to the present invention. However, set locations and values of flags may vary.

Figure 4:
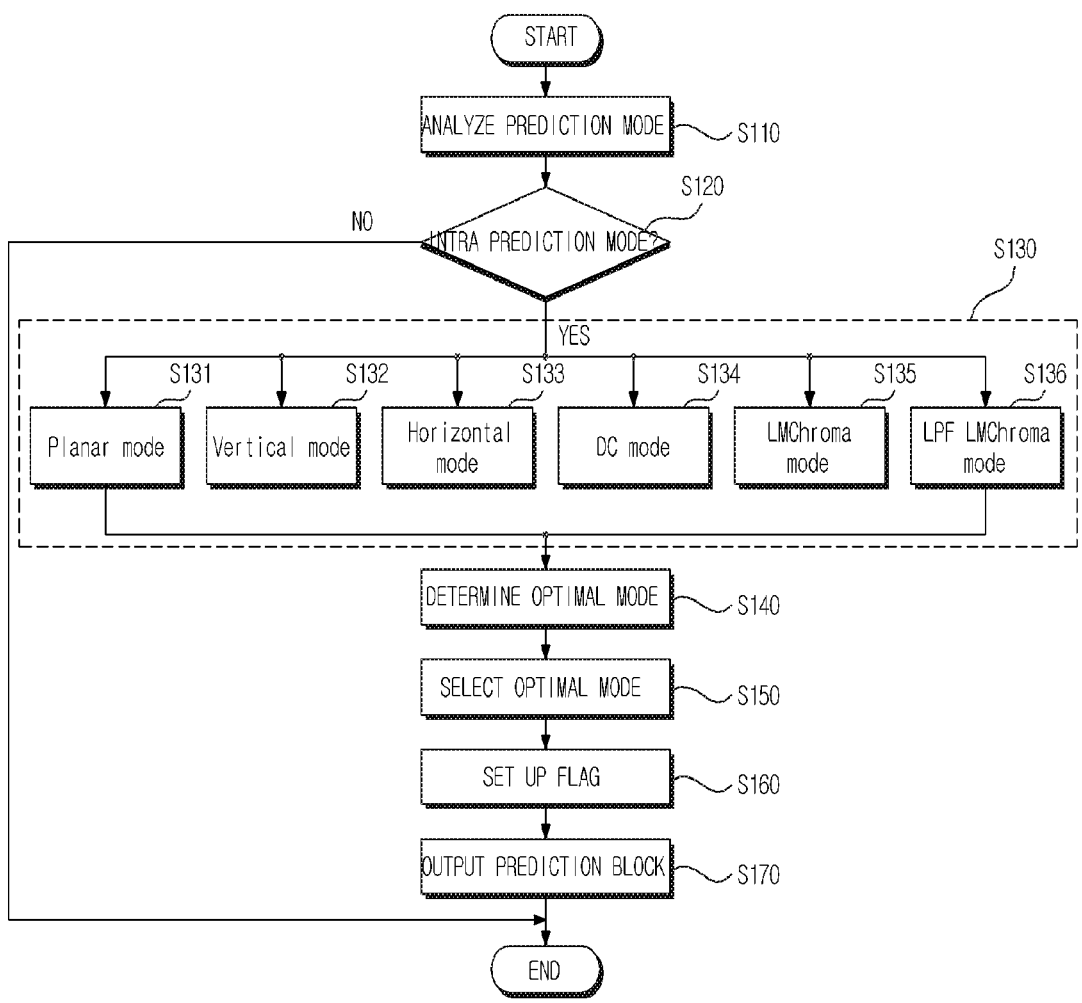
FIG. 4 is a diagram showing an example of intra prediction methods for an encoding operation performed by the intra predicting unit of FIG. 3.

FIG. 4 is a diagram showing an example of intra prediction methods for an encoding operation performed by the intra predicting unit of FIG. 3.

To describe the intra prediction method of FIG. 4 with reference to FIG. 3, the intra predicting unit 120 first analyzes a prediction mode set to the image encoding apparatus 100 (operation S110). Since the image encoding apparatus 100 may provide an inter prediction mode and an intra prediction mode as prediction modes as described above, the prediction mode of the image encoding apparatus 100 should be set to an intra prediction mode for activation of the intra predicting unit 120. Therefore, the intra predicting unit 120 first analyzes the setting of the image encoding apparatus 100. Next, it is determined as a result of the analysis whether a set prediction mode is the intra prediction mode (operation S120). If the set prediction mode is not an intra prediction mode (that is, the set prediction mode is an inter prediction mode), the inter prediction mode is performed. Since an inter prediction mode is not a task performed by the intra predicting unit 120, the intra predicting unit 120 does not perform any operation. However, if the set prediction mode is an intra prediction mode, the chroma predicting unit 121 of the intra predicting unit 120 performs block predictions by using all available prediction modes (operation S130). In FIG. 4, according to the configuration of the chroma predicting unit 121 of FIG. 3, each of six prediction units, which are the planar mode prediction unit PM, the vertical mode prediction unit VM, the horizontal mode prediction unit HM, the DC mode prediction unit DC mode, the LM chroma mode prediction unit LMCM, and the LPF LM chroma mode LPFM, generates prediction blocks in a pre-set corresponding mode. Here, as described above, the LPF LM chroma mode LPFM performs a low pass filtering with respect to the luma (G) area and generates prediction blocks regarding chroma (B, R) areas by using the color plane of the low pass filtered luma (G) area.

Furthermore, the generated prediction blocks are transmitted to the rate-distortion optimizing unit 122, and the rate-distortion optimizing unit 122 analyzes pixel values of the prediction blocks and determine an optimal mode (operation S140). When the optimal mode is determined by the rate-distortion optimizing unit 122, the mode selecting unit 123 selects the determined optimal mode (operation S150). Next, a flag is set up according to pre-set rules based on the selected optimal mode (operation S160). When a flag is set up, the mode selecting unit 123 outputs the set up flag together with a selected prediction block (operation S170).

Figure 5:
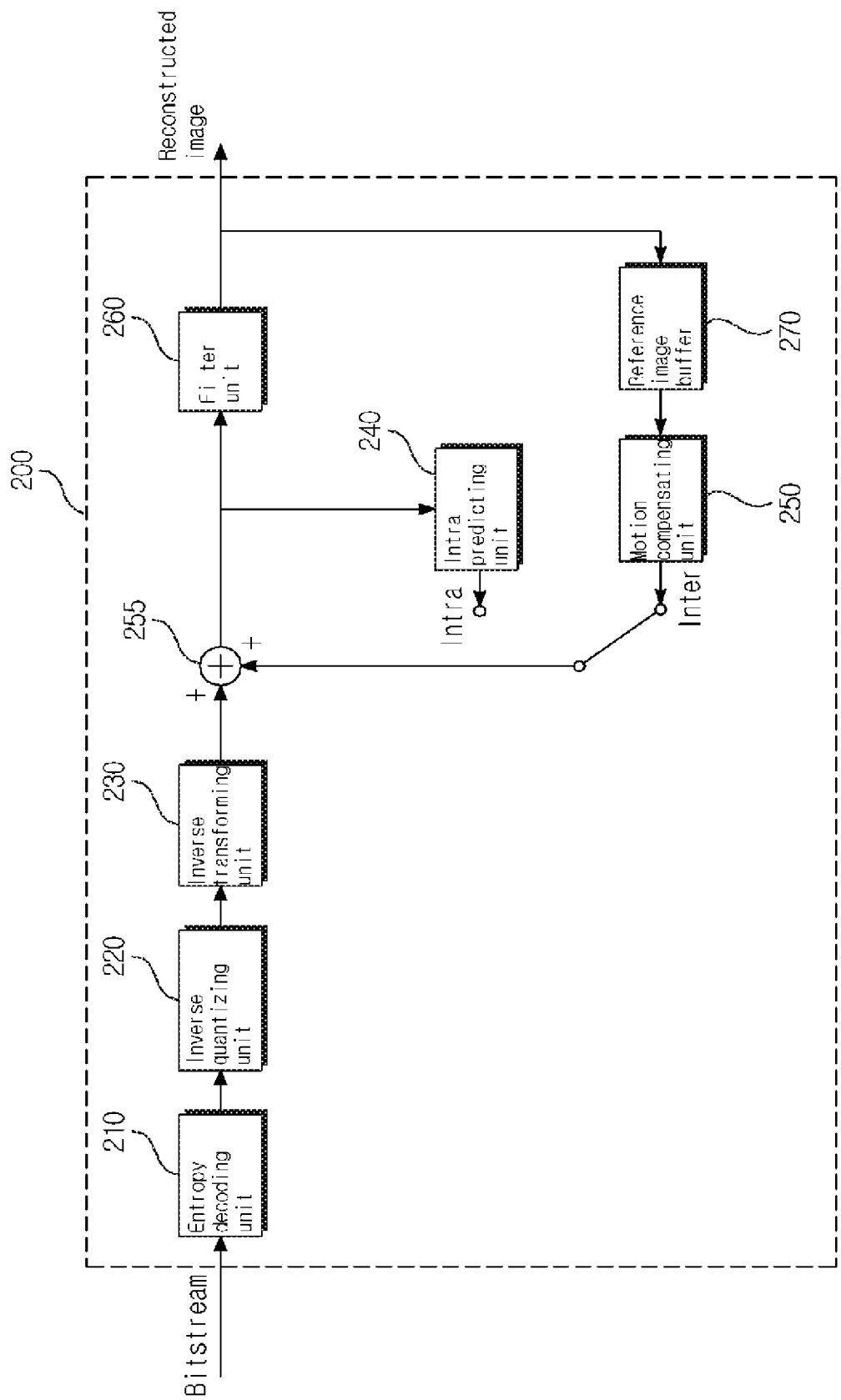
FIG. 5 is a schematic block diagram showing an example structure of an image decoding apparatus according to an embodiment of the present invention.

FIG. 5 is a schematic block diagram showing an example structure of an image decoding apparatus according to an embodiment of the present invention.

Referring to FIG. 5, an image decoding apparatus 200 includes an entropy decoding unit 210, an inverse quantizing unit 220, an inverse transforming unit 230, an intra predicting unit 240, a motion compensating unit 250, a filter unit 260, and a reference image buffer 270.

The image decoding apparatus 200 receives a bitstream output by an encoding apparatus, decodes the bitstream in an intra mode or an inter mode, and outputs a reconstructed image, that is, a reconstructed image. In an intra mode, a prediction block is generated by using an intra prediction mode. In an inter mode, a prediction block is generated by using an inter prediction mode. The image decoding apparatus 200 obtains a residual block from an input bitstream, generates a prediction block, and generates a block reconstructed by adding the residual block to the prediction block, that is, a reconstructed block.

The entropy decoding unit 210 decodes the input bitstream based on probability distribution and outputs a quantized coefficient. The quantized coefficient is inverse quantized by the inverse quantizing unit 220 and is inverse transformed by the inverse transforming unit 230. As a result of the inverse quantization and the inverse transformation of the quantized coefficient, a residual block is generated.

In an intra prediction mode, the intra predicting unit 240 generates a prediction block by performing a spatial prediction by using pixel values of blocks around a current block. Here, in particular, the intra predicting unit 240 according to the present invention analyzes the flag of an input bitstream and, if the flag is set to the LPF LM chroma mode, like the intra predicting unit 120 of the image encoding apparatus 100 of FIG. 2, the intra predicting unit 240 removes high frequency ingredients of the decoded luma (G) area by using a low pass filter (LPF) and predicts pixel values of chroma (B, R) areas with reference to pixel values regarding the luma (G) area from which the high frequency ingredients are removed.

In an inter prediction mode, the motion compensating unit 250 generates a prediction block by performing motion compensation by using a motion vector and a reference image stored in the reference image buffer 270.

The residual block and the prediction block are combined by the adder 255, and the combined block is processed by the filter unit 260. The filter unit 260 may apply at least one of a deblocking filter, a SAO, and an ALF to a reconstructed block or a reconstructed picture. The filter unit 260 outputs a reconstructed image, that is, a reconstructed image. The reconstructed image is stored in the reference image buffer 270 and may be used for an inter prediction.

Figure 6:
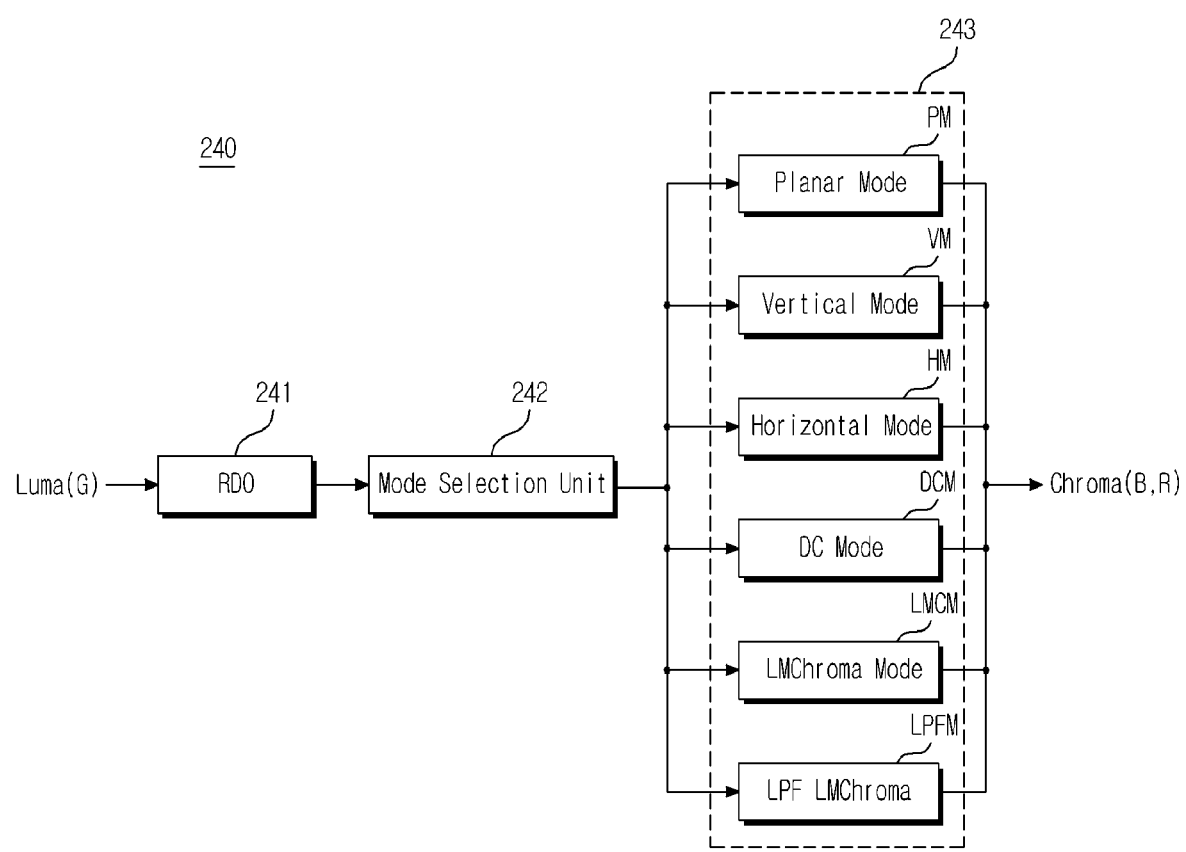
FIG. 6 is a diagram showing an example of detailed configurations of an intra prediction unit.

FIG. 6 is a diagram showing an example of detailed configurations of an intra prediction unit.

An intra predicting unit 240 of FIG. 6 includes a flag analyzing unit 241, a mode selecting unit 242, and a chroma predicting unit 243.

The flag analyzing unit 241 analyzes a flag included in a bitstream and transmits information regarding an analyzed mode to the mode selecting unit 242. The mode selecting unit 242 selects one of a planar mode prediction unit PM, a vertical mode prediction unit VM, a horizontal mode prediction unit HM, a DC mode prediction unit DC mode, a LM chroma mode prediction unit LMCM, and a LPF LM chroma mode LPFM included in the chroma predicting unit 243 based on the mode analyzed by the flag analyzing unit 241, activates the selected prediction unit, and transmits the received bitstream to the activated prediction unit.

The chroma predicting unit 243 includes the planar mode prediction unit PM, the vertical mode prediction unit VM, the horizontal mode prediction unit HM, the DC mode prediction unit DC mode, the LM chroma mode prediction unit LMCM, and the LPF LM chroma mode LPFM, each of which is activated according to a selection of the mode selecting unit 242 and generates a prediction block according to pre-set rules.

In particular, similar to the LM chroma mode prediction unit LMCM, the LPF LM chroma mode LPFM predicts pixel values of the chroma (B, R) areas with reference to pixel values of the luma (G) area. However, the LPF LM chroma mode LPFM removes high frequency ingredients of the decoded luma (G) area by using a low pass filter (LPF) and predicts pixel values of chroma (B, R) areas with reference to pixel values regarding the luma (G) area from which the high frequency ingredients are removed.

Table 3 shows a result of analyzing performance of a LPF LM chroma mode according to the present invention by applying the LPF LM chroma mode to first frames of the eight RGB experimental images of Table 1. Table 3 was obtained by using the HM10.0_RExt2.0 program, where the HEVC range extension common test conditions (D. Flynn, K. Sharman, "Common test conditions and software reference configurations for HEVC range extensions", JCTVC-L1006, 12th Meeting, Geneva, Switzerland, January 2013) were applied for setting experiment variables. Furthermore, performance of the suggested algorithm technique has been tested in All-Intra (AI) mode by using 8 RGB 4:4:4 test images, where a LPF used in the test was 2D-separatble LPF (ho=[1 2 1]/4). As shown in Table 3, compared to the conventional LM chroma mode, when an intra prediction mode for chroma pixel according to the present invention was performed, average bitrate-gains of 0.4%, 0.6%, and 0.8% could be obtained at respective color planes G, B, and R at the All Intra HE Super-High-tier compared to the ECM, which is the conventional LM chroma mode. Therefore, an overall average bitrate-gain of 0.6% could be obtained. Furthermore, encoding speed was increased by about 8%, whereas decoding speed was increased by 1%. In particular, since the decoding speed (complexity), which is most sensitive to speed increase, an average bitrate-gain of 0.6% could be obtained without increasing encoding and decoding speeds according to the technique according to the present invention. Therefore, the technique according to the present invention may be considered as an efficient technique.

TABLE 3

| | All Intra HE Super-High-tier | | |
|---|---|---|---|
| | G | B | R |
| Traffic | 0.0% | −0.2% | −0.6% |
| Kimono1 | −0.6% | −0.9% | −0.9% |
| EBULupoCandlelight | −0.5% | −0.7% | −0.9% |
| EBURainFruits | 0.6% | 0.0% | −0.5% |
| VenueVu | −0.8% | −1.3% | −1.2% |
| DucksAndLegs | −0.5% | −0.3% | −0.1% |
| OldTownCross | −0.6% | −0.8% | −0.8% |
| ParkScene | −0.7% | −0.9% | −0.9% |
| Overall | −0.4% | −0.6% | −0.8% |
| Enc Time[%] | | | 108% |
| Dec Time[%] | | | 101% |

FIG. 7 is a diagram showing an example of intra prediction methods for a decoding operation performed by the intra predicting unit of FIG. 6.

To describe the intra prediction method of FIG. 7 with reference to FIG. 6, the intra predicting unit 240 first analyzes a prediction mode set to the image decoding apparatus 200 (operation S210). Next, it is determined whether the analyzed prediction mode is the intra prediction mode (operation S220). If the set prediction mode is not an intra prediction mode, the set prediction mode is an inter prediction mode, and thus the intra predicting unit 240 is not activated and the method is terminated. However, if the set prediction mode is an intra prediction mode, a bitstream is received, and the flag of the received bitstream is analyzed (operation S230). It is determined through the analysis of the flag whether the flag set to the bitstream indicates a LPF LM chroma mode (operation S240). If the set flag does not indicate the LPF LM chroma mode, a prediction block is generated in a mode corresponding to the set flag (operation S260). If the set flag is the LPF LM chroma mode, a low pass filtering is performed with respect to a luma (G) area (operation S250). Next, prediction blocks regarding chroma (B, R) areas are generated by using the color plane of the low pass filtered luma (G) area (operation S260). Next, the generated prediction blocks are output (operation S270).

As described above, methods, apparatuses, and systems for encoding and decoding an image according to the present invention separately provide an LPF LM chroma mode for applying a low pass filtering with respect to a high frequency area corresponding to a low correlation between color planes and select an optimal mode from between a conventional intra prediction mode and the LPF LM chroma mode for encoding and decoding an image, thereby improving coding efficiency.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An image encoding method employed by an image encoding apparatus comprising a processor, the method comprising:
    selecting one of an intra prediction mode and an inter prediction mode as a prediction mode of a current block; and
    predicting, in response to the intra prediction mode being selected as the prediction mode of the current block, a chroma pixel of the current block based on one of a plurality of LMmode candidates of a LMmode, the LMmode representing that chroma pixels are predicted by luma pixels,
    wherein a flag specifying whether the LMmode is applied to the current block is encoded into a bitstream,
    wherein, in response to the flag specifying that the LMmode is applied to the current block, index information specifying the one of the plurality of LMmode candidates selected for the current block is additionally encoded into the bitstream, and the plurality of LMmode candidates comprises a first LMmode and a second LMmode,
    wherein predicting the chroma pixel of the current block comprises:
        obtaining a first filtered luma value to predict the chroma pixel;
        obtaining a weight and an offset based on a linear relationship between luma pixels and chroma pixels; and
        predicting the chroma pixel based on the first filtered luma value, the weight and the offset,
    wherein, under the first LMmode, the weight and the offset are obtained based on a second filtered luma value, while, under the second LMmode, the weight and the offset are obtained in absence of the second filtered luma value,
    wherein a horizontal neighboring luma pixel adjacent to a co-located luma pixel is relied on to derive the first filtered luma value and the co-located luma pixel having a position corresponding to the chroma pixel,
    wherein the first filtered luma value is obtained based on a weighted sum operation using the co-located luma pixel and the horizontal neighboring luma pixel, and
    wherein the chroma pixel is predicted by an equation $C_{pred}[x, y]=\alpha G_{recon}^{lpf}[x, y]+\beta$ (wherein, $G_{recon}^{lpf}[x, y]$ denotes the first filtered luma value, $\alpha$ denotes the weight, and $\beta$ denotes the offset), and wherein the second filtered luma value is obtained based on a neighboring luma pixel.

2. The method of claim 1, wherein the horizontal neighboring luma pixel comprises at least one of a left neighboring luma pixel and a right neighboring luma pixel.

3. An image decoding method employed by an image decoding apparatus comprising a processor, the method comprising:
    determining a prediction mode of a current block as one of an intra prediction mode and an inter prediction mode; and
    determining, in response to the prediction mode of the current block being the intra prediction mode, whether a LMmode that represents that a chroma pixel is predicted by a luma pixel is applied to the current block based on a flag parsed from a bitstream;
    selecting one of a plurality of LMmode candidates of the LMmode; and
    predicting the chroma pixel of the current block according to the selected LMmode candidate, wherein when it is determined that the LMmode is applied to the current block, index information is additionally parsed from the bitstream, the index information specifies the one of the plurality of LMmode candidates applied to the current block, and the plurality of LMmode candidates comprises a first LMmode and a second LMmode, wherein predicting the chroma pixel of the current block comprises:
  obtaining a first filtered luma value to predict the chroma pixel;
  obtaining a weight and an offset based on a linear relationship between luma pixels and chroma pixels; and
  predicting the chroma pixel based on the first filtered luma value, the weight and the offset, wherein, under the first LMmode, the weight and the offset are obtained based on a second filtered luma value, while, under the second LMmode, the weight and the offset are obtained in absence of the second filtered luma value, wherein a horizontal neighboring luma pixel adjacent to a co-located luma pixel is relied on to derive the first filtered luma value, and the co-located luma pixel has a position corresponding to the chroma pixel, wherein the first filtered luma value is obtained based on a weighted sum operation using the co-located luma pixel and the horizontal neighboring luma pixel; and wherein the chroma pixel is predicted by an equation $C_{pred}[x, y] = \alpha G_{recon}^{lpf}[x, y] + \beta$ (wherein, $G_{recon}^{lpf}[x, y]$ denotes the first filtered luma value, $\alpha$ denotes the weight, and $\beta$ denotes the offset), and wherein the second filtered luma value is obtained based on a neighboring luma pixel.

4. The method of claim 3, wherein the horizontal neighboring luma pixel comprises at least one of a left neighboring luma pixel and a right neighboring luma pixel.

5. A method of transmitting a bitstream generated by an encoding method, the encoding method comprising:
  selecting one of an intra prediction mode and an inter prediction mode as a prediction mode of a current block; and
  predicting, in response to the intra prediction mode being selected as the prediction mode of the current block, a chroma pixel of the current block based on one of a plurality of LMmode candidates of a LMmode, the LMmode representing that chroma pixels are predicted by luma pixels, wherein a flag specifying whether the LMmode is applied to the current block is encoded into the bitstream, wherein, in response to the flag specifying that the LMmode is applied to the current block, index information specifying the one of the plurality of LMmode candidates selected for the current block is additionally encoded into the bitstream, and the plurality of LMmode candidates comprises a first LMmode and a second LMmode, wherein predicting the chroma pixel of the current block comprises:
  obtaining a first filtered luma value to predict the chroma pixel;
  obtaining a weight and an offset based on a linear relationship between luma pixels and chroma pixels; and
  predicting the chroma pixel based on the first filtered luma value, the weight and the offset, wherein, under the first LMmode, the weight and the offset are obtained based on a second filtered luma value, while, under the second LMmode, the weight and the offset are obtained in absence of the second filtered luma value, wherein a horizontal neighboring luma pixel adjacent to a co-located luma pixel is relied on to derive the first filtered luma value and the co-located luma pixel having a position corresponding to the chroma pixel, wherein the first filtered luma value is obtained based on a weighted sum operation using the co-located luma pixel and the horizontal neighboring luma pixel, and wherein the chroma pixel is predicted by an equation $C_{pred}[x, y] = \alpha G_{recon}^{lpf}[x, y] + \beta$ (wherein, $G_{recon}^{lpf}[x, y]$ denotes the first filtered luma value, $\alpha$ denotes the weight, and $\beta$ denotes the offset), and wherein the second filtered luma value is obtained based on a neighboring luma pixel.

6. The method of claim 5, wherein the horizontal neighboring luma pixel comprises at least one of a left neighboring luma pixel and a right neighboring luma pixel.

* * * * *